US007099028B2

(12) United States Patent
Schneider et al.

(10) Patent No.: US 7,099,028 B2
(45) Date of Patent: Aug. 29, 2006

(54) SYSTEMS AND METHODS FOR PROVIDING RESTRICTED WEB SITE ACCESS TO USERS OF CERTAIN BRANDS OF PRINTING DEVICE REPLACEABLE COMPONENTS

(75) Inventors: Sandra L. Schneider, Boise, ID (US); Mary B. Baumunk, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 09/910,216

(22) Filed: Jul. 20, 2001

(65) Prior Publication Data

US 2003/0016382 A1 Jan. 23, 2003

(51) Int. Cl.
*G06F 15/00* (2006.01)
*G06F 15/173* (2006.01)

(52) U.S. Cl. ..................................... 358/1.15; 709/223

(58) Field of Classification Search ............... 358/1.15; 709/223, 224; 347/7, 19, 484; 707/104.1
See application file for complete search history.

(56) References Cited

U.S. PATENT DOCUMENTS

| | | | | |
|---|---|---|---|---|
| 5,365,312 | A | 11/1994 | Hillmann et al. | |
| 6,233,408 | B1 | 5/2001 | Allen | |
| 6,289,462 | B1 * | 9/2001 | McNabb et al. | 713/201 |
| 6,363,421 | B1 * | 3/2002 | Barker et al. | 709/223 |
| 6,496,859 | B1 * | 12/2002 | Roy et al. | 709/223 |
| 6,530,065 | B1 * | 3/2003 | McDonald et al. | 716/4 |
| 6,609,461 | B1 * | 8/2003 | Horii et al. | 101/484 |
| 6,625,402 | B1 | 9/2003 | Takemoto | |
| 6,629,134 | B1 | 9/2003 | Hayward | |
| 6,719,197 | B1 | 4/2004 | Yajima | |
| 6,953,235 | B1 | 10/2005 | Silverbrook | |
| 2001/0042117 | A1 * | 11/2001 | Yoshino et al. | 709/223 |
| 2002/0013744 | A1 * | 1/2002 | Tsunenari et al. | 705/28 |

FOREIGN PATENT DOCUMENTS

| | | | |
|---|---|---|---|
| EP | 0843229 | A2 | 5/1998 |
| EP | 1061409 | A1 | 12/2000 |

* cited by examiner

*Primary Examiner*—Mark Wallerson
*Assistant Examiner*—Saeid Ebrahimi-Dehkordy

(57) ABSTRACT

Systems and methods for providing access to a restricted web site to users of certain brands of printing device replaceable components are described. When a replaceable component is installed into a printing device, the printing device determines whether the replaceable component is a particular brand of component. If it is a particular brand of component, the printing device provides access, either automatically or on command, to a web site that is restricted to users of components of the brand. The restricted web site offers incentives and information to such users that is not available to printing device users that use other brands of components in their printing devices.

5 Claims, 3 Drawing Sheets

SYSTEMS AND METHODS FOR PROVIDING RESTRICTED WEB SITE ACCESS TO USERS OF CERTAIN BRANDS OF PRINTING DEVICE REPLACEABLE COMPONENTS

TECHNICAL FIELD

This invention generally relates to printing devices having replaceable components, and more particularly, to printing devices having the capability to detect the presence of replaceable components of a particular brand and, if present, provide access to a web site restricted to users of the particular brand.

BACKGROUND

Most types of printing devices are equipped with replaceable components that have a life cycle during which the replaceable components are functional. At the end of the life cycle of a replaceable component, the component must be replaced for the printing device to continue to function properly.

For example, a toner cartridge is installed in a laser printer to provide toner for the printing process. As documents are printed, the toner supply is gradually depleted. When the toner supply is completely exhausted, the printer cannot print any further documents until the toner cartridge is replaced.

The market for replaceable components for printing devices is highly competitive. When a printing device user depletes a replaceable component that was included in the new printing device, the user has several options to replace the depleted component. For instance, the user may replace the replaceable component with a component of the same brand as was originally included in the printing device. Or, the user may choose to replace the replaceable component with one of many similar components on the market that are made by another manufacturer.

The main reason that such a user would choose a different brand of replaceable component to replace the depleted component is cost. Typically, non-name-brand replaceable components are less expensive. This is due to the fact that the research costs were not borne by the company making the component. Furthermore, such components typically use cheaper materials, such as less expensive toner (in the case of a laser printer toner cartridge). However, cheaper materials used in a replaceable component may not provide the same print quality and reliability that a user desires.

A printing device manufacturer wants to retain as many repeat customers as possible. When a customer buys a printing device and a component in that device is subsequently depleted, the printing device manufacturer must provide valuable incentives for the user to replace the component with a similar component of the same brand that was originally included in the printing device when it was sold.

SUMMARY

Systems and methods are described herein for providing a printing device with the capability to recognize a printing device replaceable component of a particular brand and provide access to a web site that is restricted to users of printing device replaceable components of that particular brand.

When a new replaceable component is installed into a printing device, the printing device reads memory integrated with the new replaceable component to determine if a brand identifier uniquely associated with a particular brand is stored in the component memory. If the brand identifier is located, then a web browser located in the printing device (or in a host computer connected to the printing device) provides access to the restricted web site (also referred to herein as a "customer loyalty page"). Otherwise, the web browser only allows access to other sites, similar to a typical web browser.

In an alternative embodiment, there are two web browsers—one is a typical web browser while the other is used only to access the restricted web site. These web browsers may also be located in the printing device itself or in a host computer connected to the printing device.

The restricted web site provides incentives for printing device users to purchase replaceable components of the same brand as the original components. This is accomplished by providing incentives such as:

- Software upgrades available only through the web site
- Specific marketing messages and promotions based on user profiles
- Offers of upgrades and trade-in information
- Sharing of tips and tricks
- Third party information that enhances the printing experience
- Space could be for sale to third parties to provide advertising
- Space could be provided to advertise joint ventures between third parties and the original manufacturer

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
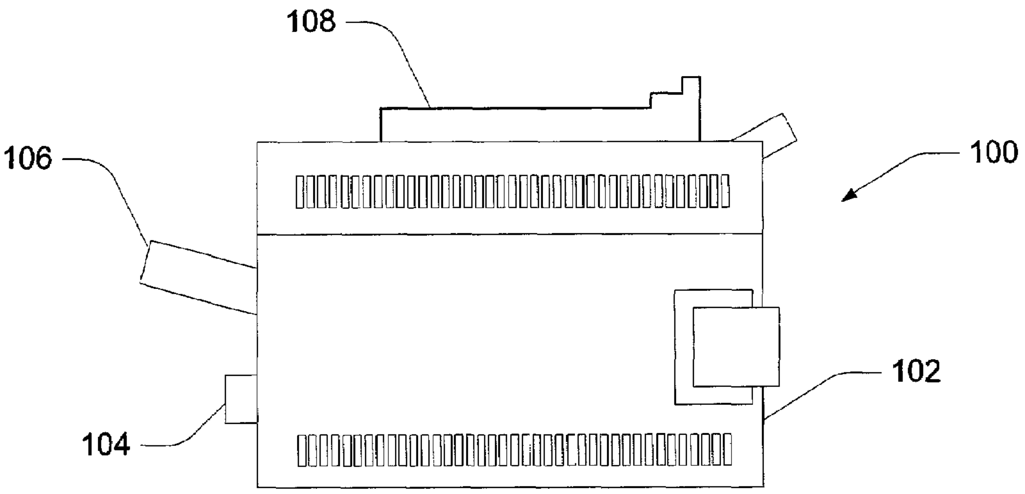
FIG. 1 is an illustration of a laser printer.

The following description sets forth one or more specific implementations and/or embodiments of systems and methods for providing access to a web site restricted to users of a particular brand of replaceable components in a printing device. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods that provide access to a restricted web site for printing devices having replaceable components of a particular brand installed therein. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

Computer-Executable Instructions

An implementation of a system and/or method for providing access to a web site restricted to users of a particular brand of printing device replaceable component may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a system and/or method for proving access to printing devices having replaceable components of a particular brand stored therein may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Printing Device and Replaceable Component with Memory

FIG. 1 is an illustration of a laser printer 100 having a housing 102, a first input paper tray 104 and a second input paper tray 106. The laser printer 100 also includes an output paper tray 108 that holds printed pages that are output by the laser printer 100. It is noted that although a laser printer 100 is shown the present invention(s) may be included with any type of printing device—such as an inkjet printer, a facsimile machine, a copy machine, etc.—that utilizes replaceable components. Furthermore, it will be recognized by those skilled in the art that many of the features shown in the laser printer 100 and/or the functions performed by those features may be performed as software modules, hardware devices and/or a combination thereof.

Figure 2:
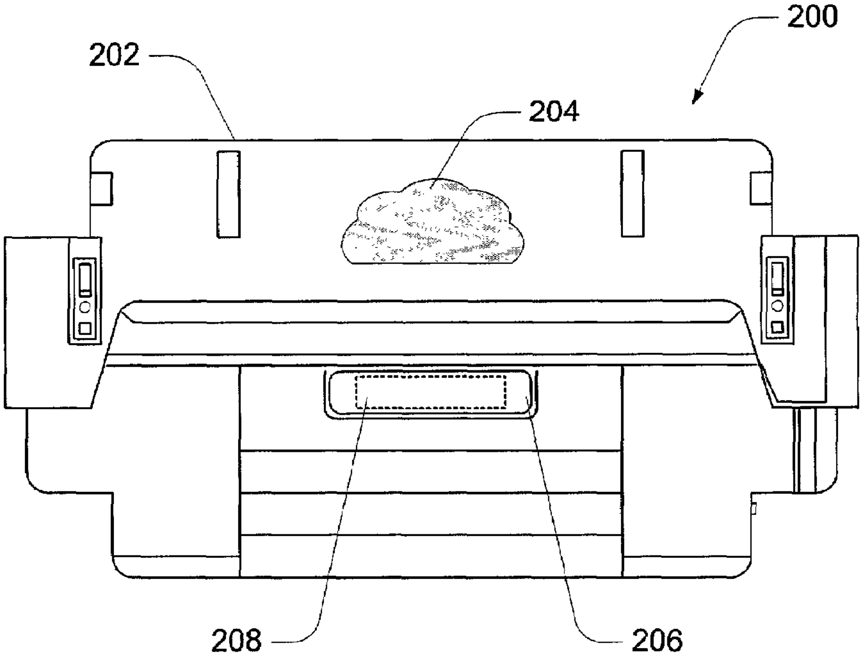
FIG. 2 is an illustration of a laser printer toner cartridge with component memory.

FIG. 2 is an illustration of a toner cartridge 200 that is installable in a laser printer (as shown in FIG. 1) and is suitable for use in the customer loyalty page system described herein. Although the invention is shown and described herein utilizes a printer toner cartridge for a laser printer, it is noted that the invention may be utilized with any replaceable component (toner cartridge, ink cartridge, imager drum, fuser, etc.) installable in a printing device (printer, copier, fax machine, etc.). The toner cartridge 200 includes a cartridge body 202 that contains a toner supply 204.

A memory tag 208 is located underneath a label 206 on the toner cartridge 200, although the memory tag 208 may be placed on the toner cartridge 200 at any location which may be practical for the purposes described herein. The memory tag 208 is preferably a radio frequency identification (RFID) memory tag, although those skilled in the art will recognize that any type of memory (semiconductor, etc.) may be used in the present invention(s), as long as the memory satisfies the requirements defined herein.

RFID memory tags and applications therefor are well known in the art. Further aspects of the functionality of the RFID memory tag 208 in the present invention(s) will become clearer as the discussion progresses. It is noted that, although the toner cartridge 200 is shown as having component memory integrated therewith, those skilled in the art will recognize that the present invention(s) may be implemented with replaceable components that do not include component memory.

Exemplary Customer Loyalty Page System

Figure 3:
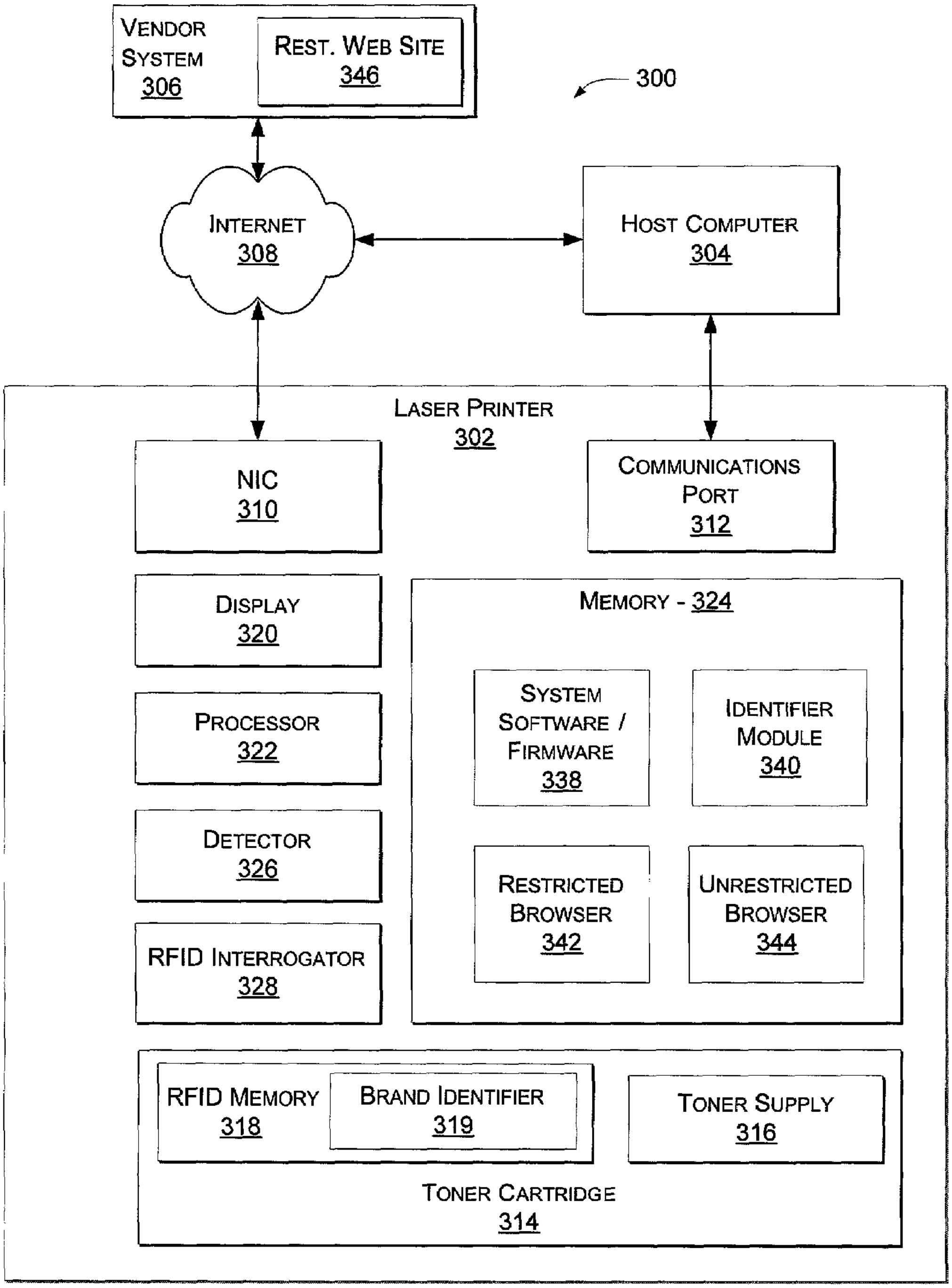
FIG. 3 is a block diagram of a laser printer having the capability to provide access to a restricted web site based on a brand identifier stored in component memory.

FIG. 3 is a block diagram of a customer loyalty page system 300 constructed in accordance with the present invention(s). The system 300 includes a laser printer 302, a host computer 304 and a vendor system 306. The laser printer 302, the host computer 304 and the vendor system 306 are all configured to communicate with the Internet 308 (or any other type of network).

The laser printer 302 includes a network interface card 310 and a communication port 312. The network interface card (NIC) 310 is configured to access and communicate with the vendor system 306. The communications port 312 is a parallel port through which the laser printer 302 communicates with the host computer 304, although it could be any port to which the host computer 304 may be connected.

The laser printer 302 also includes a replaceable toner cartridge 314 that has a toner supply 316 stored therein. Although the present discussion will focus on the replacement of the toner cartridge 314, it is noted that the invention described herein is suitable for use related to any replaceable component that is used in the laser printer 302.

The laser printer 302 further includes a display 320, a processor 322 and memory 324. A detector 326 is included that is configured to detect when a replaceable component is installed in the laser printer 302. The detector 326 is shown located in the laser printer 302 itself, although the detector 326 may be integrated into the toner cartridge 314.

The toner cartridge 314 also includes a radio frequency identification (RFID) tag 318 that stores a brand identifier 319. The brand identifier 319 identifies the brand of the toner cartridge 314. It is noted that, although the memory 318 shown on the laser printer 314 is an RFID memory tag 318, any suitable memory may be used as long as the memory satisfies the objectives of the invention(s) described herein.

As described in the exemplary customer loyalty page system described herein, a brand of a replaceable component is recognized simply by reading the brand identifier 319 from the RFID memory tag 318. It is noted that those skilled in the art will recognize that this is a simplistic way to describe the brand identification process in the context of the entire invention(s) described herein. There are more complicated schemes that may be used to recognize a brand of a replaceable component.

For example, in the simplified brand identification method outlined herein, if a counterfeiter refilled a toner cartridge with new toner and resold the recharged toner cartridge, then the toner cartridge would be recognized as being a toner cartridge of the original brand. Therefore, other methods known in the art should be combined with the simplified brand identification scheme outlined herein for practical use of the customer loyalty page system. However, for purposes of the present discussion, the brand identification method as outlined herein will be the only brand identification method described.

The laser printer 302 further includes an RFID interrogator 328 that is configured to read the contents stored in the RFID memory tag 218 on the toner cartridge 314. More particularly, the RFID interrogator 328 is configured to read the brand identifier 319 from the RFID memory tag 318.

The memory 324 of the laser printer 302 stores modules used to provide access to a restricted website, i.e., the vendor system 306, in the event the laser printer 302 contains components 314 having a particular brand identifier 319 stored therein. It is noted that the modules 338–344 stored in the memory 324 may be implemented as software modules, hardware units, or a combination of both.

The memory 324 as shown includes a system software/firmware module 338 that stores operating instructions for the laser printer 302. The memory 324 also contains an identifier module 340 that is configured to receive the brand identifier 319 from the RFID interrogator 328 and determine if the brand identifier 319 indicates that the toner cartridge 314 is a particular brand.

If the identifier module 340 determines that the toner cartridge 314 is of a particular brand, then the identifier module 340 allows access to a printing device user to a restricted browser 342. If the toner cartridge 314 is of a different, non-conforming brand, then the identifier module 340 only allows the printing device user to access the unrestricted browser 344, which is a typical browser found in many printers and computers.

The vendor system 306 includes a restricted web site 346 that is not accessible by a typical browser. The restricted browser 342 is configured to identify itself to the restricted web site 346 so that the restricted web site 346 allows the restricted web browser 342 to access the restricted web site 346.

It is noted that instead of two separate browsers, namely the restricted browser 342 and the unrestricted web browser 344, only one browser is technically necessary. If the access to the restricted web site 346 on the vendor system 306 is controlled by the vendor system 306, then only one browser is necessary in the laser printer 302. If such a single browser cannot present brand identifier credentials to the restricted site 346, then the restricted site 346 can deny access to the single browser.

It is noted that many of the functional features depicted in the laser printer 302 may be implemented in the host computer 304 without affecting the operability of the invention(s) described herein. In that instance, certain features of the laser printer 302 will simply convey pertinent data to the host computer 304 for processing and/or for communication with the vendor system 306.

Methodological Implementation of the Loyalty Page System

Figure 4:
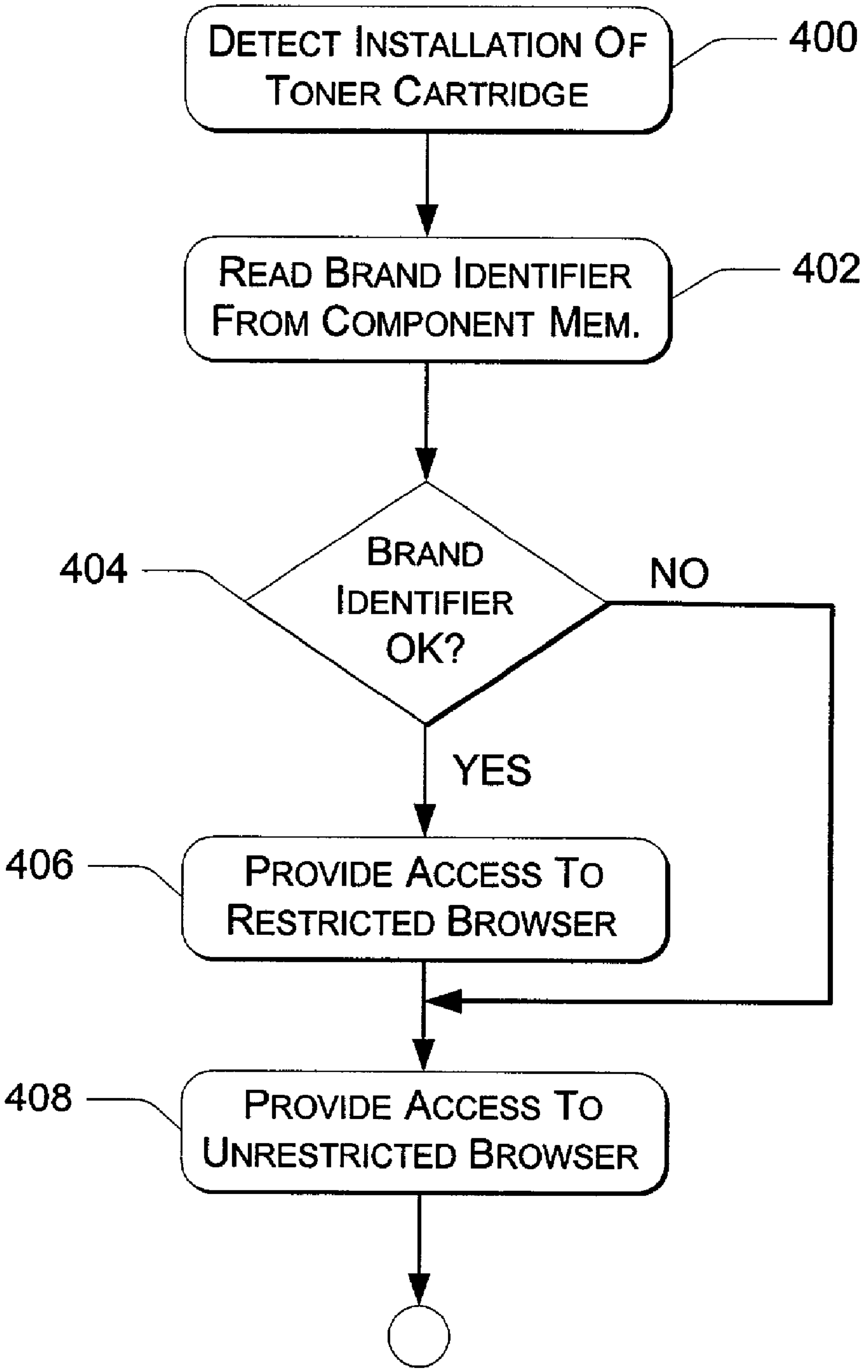
FIG. 4 is a flow diagram depicting a methodological implementation of a system that provides access to a restricted web site exclusively for users of replaceable components of a particular brand.

FIG. 4 is a flow diagram depicting a methodological implementation of the system described herein that allows users of particular printing device replaceable components access to a restricted web site 346. Continuing reference in the discussion of the methodological implementation will be made to the features and reference numerals recited in FIG. 3.

At block 400, the detector 326 detects that a replacement toner cartridge 314 is installed into the laser printer 302. Upon detection of the installation, the RFID interrogator 328 reads the brand identifier 319 stored in the RFID memory 318 of the toner cartridge 314 (block 402). The RFID interrogator 328 passes the brand identifier 319 to the identifier module 340 to determine if the brand identifier 319 identifies a toner cartridge 314 manufactured by the manufacturer of the original toner cartridge that came with the laser printer 302.

If the brand identifier 319 matches the brand of the original toner cartridge ("Yes" branch, block 404), the access is provided to the restricted browser 342 so that the restricted web site 346 may be accessed. If, however, the brand identifier 319 indicates that the toner cartridge 314 is a different brand than the original toner cartridge ("No" branch, block 404), then access is provided only to the unrestricted web browser 344 that allows access to unrestricted web sites in the same manner as does a typical web browser.

Although blocks 404 through 408 indicate the use of two separate browsers to access the restricted and unrestricted web sites, as previously discussed, only a single web browser may be used. In such a case, block 406 ("Provide Access To Restricted Browser") could instead be to provide data that can be provided to the restricted web site to allow access thereto. Otherwise, only typical access to unrestricted web sites via a standard web browser would be allowed.

Conclusion

Implementation of the customer loyalty page system described herein provides additional incentives for a printing device user to replace replaceable components with original equipment replaceable components. In this way, the manufacturer of the printing device is provided with an additional way in which to retain loyal customers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A printing device, comprising:

a replaceable component;

a detector configured to detect when the replaceable component is installed in the printing device;

an interrogator configured to read and identify a brand identifier stored in a component memory integrated with the replaceable component, the brand identifier uniquely identifying a brand of the replaceable component installed in the printing device; and a program module configured to access a restricted Web site that is restricted to devices that include replaceable components of a particular brand, the program module being further configured to access the restricted Web site if the brand of the replaceable component installed in the printing device is identified as being of the particular brand.

2. The printing device as recited in claim 1, wherein the program module is a dedicated Web browser that can only access the restricted Web site; and further comprising a general Web browser that is configured to provide access to one or more unrestricted Web sites to users of products not having the particular brand.

3. The printing device as recited in claim 1, wherein:

the interrogator further comprises a radio frequency identification (RFID) interrogator; and the component memory further comprises RFID memory.

4. The printing device as recited in claim 1, wherein the replaceable component further comprises a laser printer toner cartridge.

5. The printing device as recited in claim 1, wherein the replaceable component further comprises an ink jet printer ink cartridge.

* * * * *